(12) United States Patent
Bhardwaj et al.

(10) Patent No.: US 6,914,907 B1
(45) Date of Patent: Jul. 5, 2005

(54) METHOD AND APPARATUS FOR PROVIDING MULTI-CAST TRANSMISSIONS USING A DISTRIBUTED ROUTER

(75) Inventors: Rajeev Bhardwaj, Union City, CA (US); Pawan Singh, Palo Alto, CA (US); Curt Moffitt, Sunnyvale, CA (US); Paul Grepps, South Riding, VA (US); Medhavi Bhatia, Rockville, MD (US); Sanjay Khanna, Novato, CA (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/368,651

(22) Filed: Aug. 5, 1999

(51) Int. Cl.⁷ .................................................. H04J 3/26
(52) U.S. Cl. ...................................... 370/432; 370/390
(58) Field of Search .......................... 370/395.1, 395.51, 370/395.52, 395.53, 389, 390, 432

(56) References Cited

U.S. PATENT DOCUMENTS

| | | | | |
|---|---|---|---|---|
| 5,926,463 A | * | 7/1999 | Ahearn et al. | 370/254 |
| 6,216,167 B1 | * | 4/2001 | Momirov | 370/229 |
| 6,331,983 B1 | * | 12/2001 | Haggerty et al. | 370/400 |
| 6,343,326 B2 | * | 1/2002 | Acharya et al. | 709/238 |
| 6,654,371 B1 | * | 11/2003 | Dunstan et al. | 370/390 |

* cited by examiner

Primary Examiner—Duc Ho
Assistant Examiner—Thien D Tran

(57) ABSTRACT

A method and apparatus that includes processing for providing multi-cast transmissions within a data network begins by determining, for a source virtual network, a list of downstream virtual sub-networks for multi-cast traffic based on a multi-cast routing protocol. The processing then continues by determining multi-cast group membership on as per downstream virtual sub-network, edge device, and port basis. The process continues when a data packet is received via the source virtual network. The processing then continues by generating a multi-cast session table entry based on the list of downstream virtual sub-networks and the multi-cast group membership. The process continues by establishing virtual connections between the source virtual network and edge devices coupled to virtual sub-networks identified in the list of downstream virtual sub-networks. Having generated the virtual connections, the processing continues by downloading the multi-cast session table to the edge devices. The edge devices utilize the multi-cast session table entry to determine where the received data packets are to be forwarded.

39 Claims, 6 Drawing Sheets

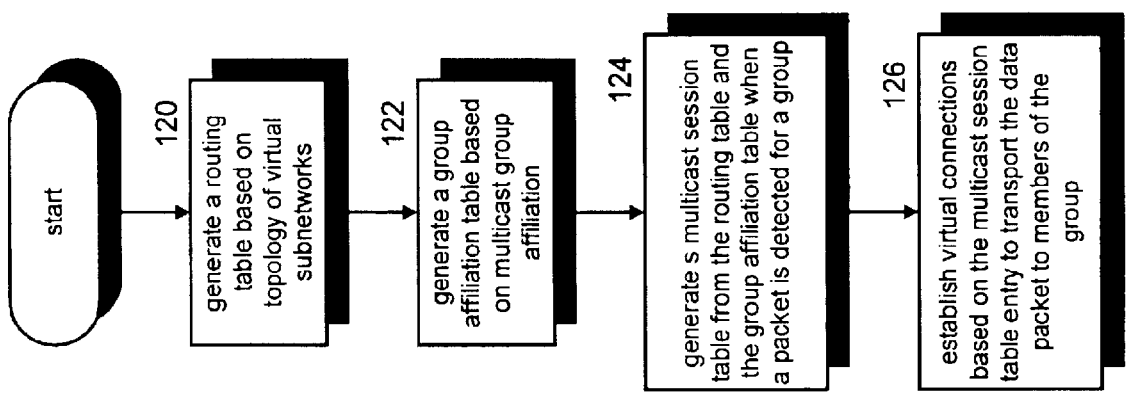

METHOD AND APPARATUS FOR PROVIDING MULTI-CAST TRANSMISSIONS USING A DISTRIBUTED ROUTER

TECHNICAL FIELD OF THE INVENTION

This invention relates generally to data networks and more particularly to multi-cast transmissions within a data network.

BACKGROUND OF THE INVENTION

As is known, a data network includes a plurality of routers interoperably coupled to provide communication paths between a plurality of sub-networks. The sub-networks include end users such as personal computers, work stations, telephones, facsimile machines, etc. Within a sub-network, end users may communicate directly over a shared communication link.

For an end user in one sub-network to communication with an end user in another sub-network, the sending end user generates a message, which is provided via a physical interface to a router. The router interprets the message to determine whether the message is to be forwarded to another router or to the addressed end user. Each router that receives the message, which is typically formatted as data packets in accordance with a data transport protocol such as ATM, frame relay, IP, interprets the message and makes a similar determination. As such, the message propagates through the data network from router to router until it eventually reaches the targeted end user. Routers determine how to forward the received data packets based on forwarding information. The forwarding information is generated in response to communicating with other routers utilizing a routing protocol. As such, once the forwarding information is generated, the router, upon receiving a packet, forwards the packet according to the forwarding information.

In legacy routers, the forwarding components, forwarding engines, and the route computational engine were in the same physical device. As such, a router typically supported a sub-network in a local geographic area. For example, the data network having many sub-networks may be owned and operated by a university, which has several buildings. Note that the sub-networks may correspond to departments such as engineering, finance, administration, etc. Accordingly, each sub-network in each building had its own router, which was coupled to other routers in the same building and to routers in other buildings. Thus, for an end-user in one subnetwork to communicate with another end-user in a different subnetwork, a communication path, supported by the routers, would be established. This was the case, even if both end-users were in the same department, e.g., engineering, but in different buildings.

To more efficiently service a data network, distributed routers were created. A distributed router includes a routing server and a plurality of edge devices, or forwarding engines. The edge devices may be located in physically diverse areas from each other and from the routing server. For example, in the data network operated by a university, the engineering department may be located in several buildings. Utilizing distributed routers, the edge devices coupled to the engineering departments in separate buildings may be lumped into a single virtual network. As such, when a member of the engineering group needs to communicate with other members of the engineering group, it sends a message to the group, which is interpreted by the distributed router. In response, the distributed router causes data packets of the message to be provided to the diverse locations via the physical separate edge devices.

In data communications, conveying messages from one to many is done by either multi-cast transmissions or in broadcast transmissions. In a multi-cast transmission, the message is sent to targeted members of the group while in a broadcast transmission, the message is sent to all members in the group. In data networks that include distributed routers, multi-cast transmissions for a virtual network are treated as broadcast. As such, each memory of the virtual sub-network receives the message whether they need it or not. As such, unnecessary data transmission occurs.

Another limitation of current data networks for multi-cast transmissions occurs when members of the group are in different virtual subnetworks. As mentioned, multi-cast transmissions are currently treated as broadcast transmissions. As such, only the end users in the same virtual network as the sending end user will receive it. Thus, members within the sending end units virtual network will receive a message when they don't need it and members of the group that are affiliated with a different sub-network will not receive the message.

In data networks that include legacy routers, multi-cast transmissions are processed in accordance with standardized protocols. For example, multi-cast routing is typically done in accordance with a distance vector multi-cast routing protocol (DVMRP), multi-cast group management is done utilizing inter-network group management protocol (IGMP), and multi-cast traffic forwarding is handled utilizing a multi-cast server approach (MSC). Alternatively, the multi-cast routing may be done by utilizing a standard protocol of M-OSPF or PIM, while multi-cast traffic forwarding may be done by using a VC mesh. While these protocols work well with legacy routers, when the data network includes distributed routers, application of these standardized protocols do not work and/or produce a substantial amount of unnecessary data traffic.

Therefore a need exists for a method and apparatus for providing multi-cast transmissions within a data network including distributed routers utilizing the standardized protocols designed for legacy routers without unnecessary data traffic.

BRIEF DESCRIPTION OF THE DRAWINGS

FIG. 6 illustrates a logic diagram of an alternate method for providing multi-cast transmissions using distributed routers in accordance with the present invention.

DETAILED DESCRIPTION OF A PREFERRED EMBODIMENT

Generally, the present invention provides a method and apparatus that includes processing for providing multi-cast transmissions within a data network having at least one distributed router. Such processing begins by determining, for a source virtual network, a list of downstream virtual sub-networks for multi-cast traffic based on a multi-cast routing protocol. Such a multi-cast routing protocol may be DVMRP. The processing then continues by determining multi-cast group membership on as per downstream virtual sub-network, edge device, and port basis. Such multi-cast group membership may be determined by utilizing an IGMP protocol. The process continues when a data packet is received via the source virtual network. The source virtual network is the sub-network to which the sending end user is affiliated with. The processing then continues by generating a multi-cast session table entry based on the list of downstream virtual sub-networks and the multi-cast group membership. In essence, the multi-cast session group table entry identifies where the data packets should be sent. The process continues by establishing virtual connections between the source virtual network and edge devices coupled to virtual sub-networks identified in the list of downstream virtual sub-networks. Having generated the virtual connections, the processing continues by downloading the multi-cast session table to the edge devices. The edge devices utilize the multi-cast session table entry to determine where the received data packets are to be forwarded. With such a method and apparatus, multi-cast transmissions within a data network that includes at least one distributed router maybe done on a multi-cast basis, i.e., only to targeted members of a group, wherein the members of the group span across multiple virtual sub-networks without unnecessary data traffic.

Figure 1:
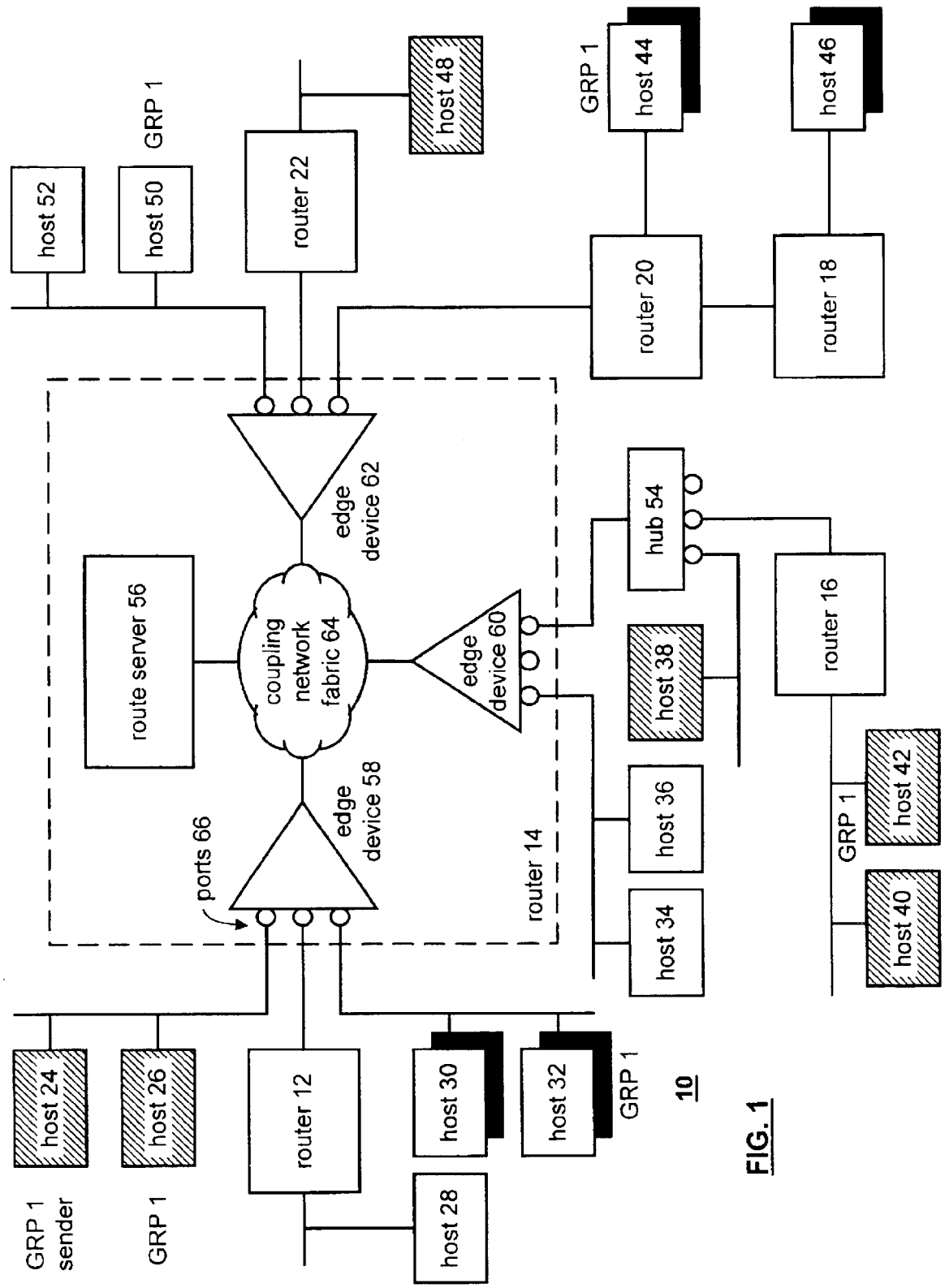
FIG. 1 illustrates a schematic block diagram of a data network in accordance with the present invention.

The present invention can be more fully described with reference to FIGS. 1–6. FIG. 1 illustrates a data network 10 that includes a plurality of routers 12–22, which support a plurality of virtual sub-networks. In the illustration of the data network 10, the data network 10 is supporting three virtual sub-networks. The first virtual sub-network includes hosts 24, 26, 38, 40, 42, and 48. The second virtual sub-network includes hosts 28, 34, 36, 50, and 52. The third virtual sub-network includes hosts 30, 32, 44, and 46. Note that a host may be a personal computer, workstation, laptop, video telephone, telephone, facsimile machine, and/or any device that transceives digital and/or analog information via a network.

Router 14 is shown as a distributed router that includes a route server 56, a plurality of edge devices 58–62, each including a plurality of ports 66. The edge devices 58–62 are operably coupled to the route server 56 via a coupling network fabric 64. The coupling network fabric 64 may be the public telephone switch network, an asynchronous transfer mode network, and/or any means for communicating between distributed locations. Routers 12, 16–22 may be legacy routers, i.e., containing the route server and edge devices within a single physical device, or distributed routers. In either case, the routers utilize a standardized routing protocol to communicate with each other to determine the topology of the data network 10.

FIG. 1 further illustrates a multi-cast group, e.g., group 1, that spans across the virtual sub-networks. As shown, hosts 24, 26, and 42 of virtual sub-network 1 are members of the group, while host 50 of sub-network 2 is a member, and hosts 32 and 44 of the third virtual sub-network are members. As such, when a group communication is initiated by a sending host, in this example host 24, the distributed router 14 needs to establish virtual connections between the ports of the edge devices that support a member of the group. This process will be discussed in greater detail with reference to FIGS. 2–6.

Figure 2:
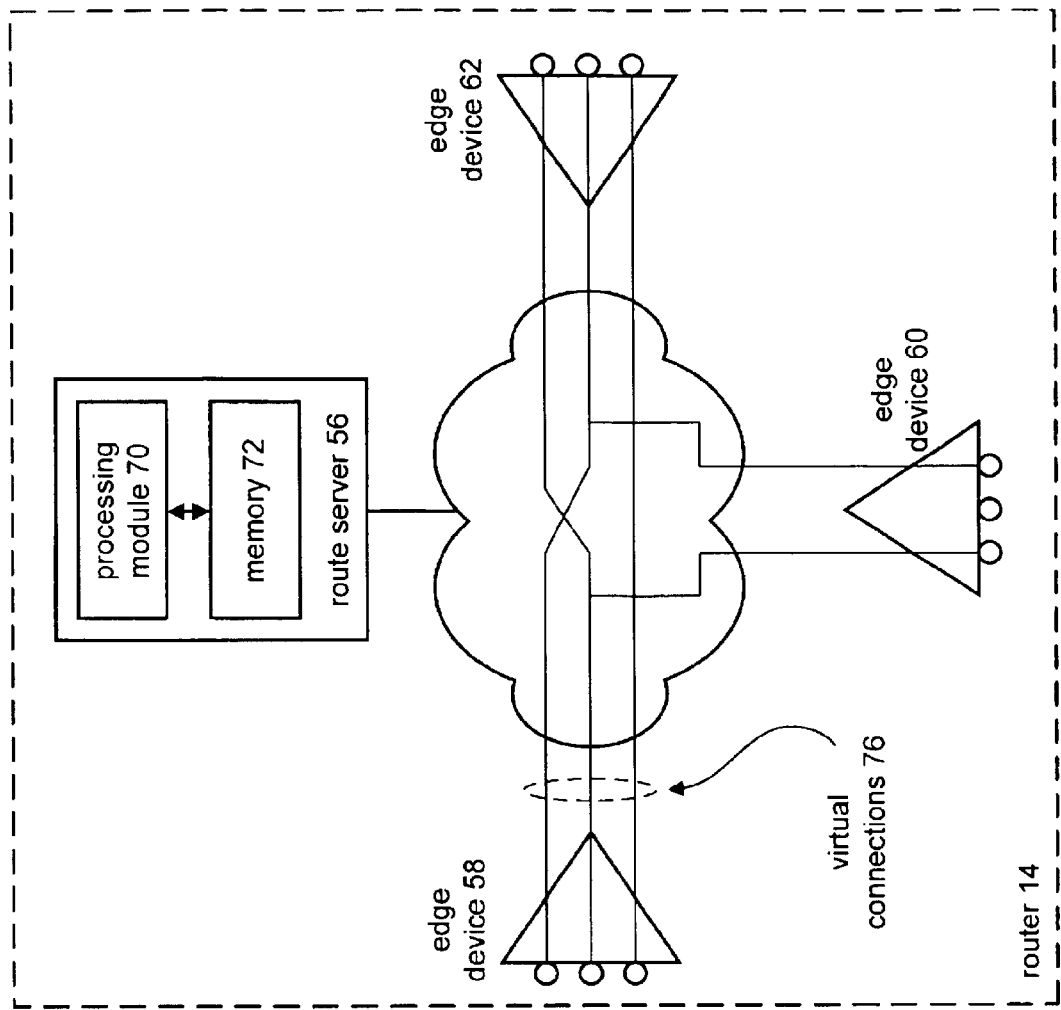
FIG. 2 illustrates a distributed router in accordance with the present invention.

FIG. 2 illustrates the virtual router 14 having established virtual connections 76 to support the virtual sub-networks. As previously mentioned, the routers communicate with each other utilizing a routing protocol to obtain the topology of the data network 10. A topology includes identifying the virtual sub-networks. Based on this information, a routing table is generated to support the virtual sub-networks. As shown, for router 14, the first virtual sub-network includes a virtual connection 76 that couples port 1 of edge device 58 to port 3 of edge device 60 and to port 2 of edge device 62. Similarly, the second virtual sub-network includes a virtual connection 76 that couples port 2 of edge device 58 to port 1 of edge device 60 and to port 1 of edge device 62. The third virtual subnetwork includes a virtual connection 76 that couples port 3 of edge device 58 to port 3 of edge device 62.

To support communications within a virtual sub-network, router 14 establishes the virtual connections 76, which may be established as switched virtual connections, or permanent virtual connections. Once the virtual connections 76 are established, data traffic between the host of the virtual sub-network may commence. However, for a multi-cast group transmission, for example the group 1 transmission, which spans multiple virtual sub-networks, merely coupling virtual sub-network 1 to virtual sub-network 2 to virtual sub-network 3 would send the message to many more users than needed. In other words, by merely coupling the three subnetworks together, the message is being broadcast as opposed to a multi-cast, which is inefficient.

The router server 56 includes a processing module 70 and memory 72. The processing module 70 may be a single processing device or a plurality of processing devices. Such a processing device may be a microprocessor, microcomputer, digital signal processor, microcontroller, state machine, logic circuitry, and/or any device that manipulates signals, analog or digital, based on operation instructions. The memory 72 may be a single memory device or a plurality of memory devices. Such a memory device may be a read-only memory, random access memory, floppy disk memory, hard drive memory, system memory, and/or any device that stores operational instructions. Note that if the processing module 70 implements one or more of its functions via state machine or logic circuitry, the memory 72 storing the corresponding operational instructions is embedded within the circuitry comprising the state machine or logic circuit. The operational instruction stored in memory and executed by processing module 72 will be discussed in greater detail with reference to FIGS. 5 and 6.

Figure 3:
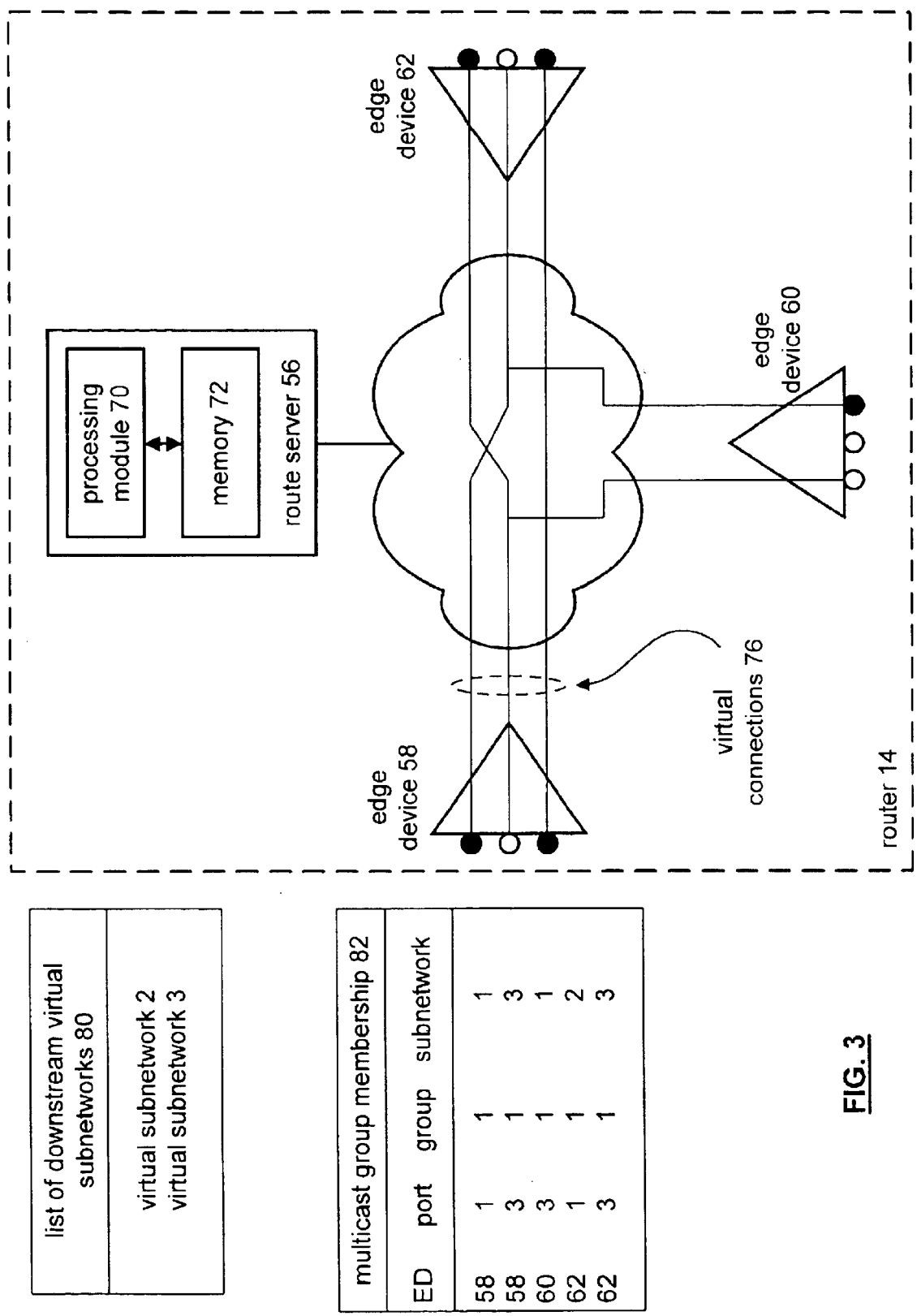
FIG. 3 illustrates a distributed router and associated lists in accordance with the present invention.

To provide a more efficient multi-cast transmission, i.e., to only the members of the group, the distributed router 14 first determines a list of downstream virtual sub-networks based on the virtual sub-network of the sending, or initiating group, member. In this example, host 24 of virtual sub-network 1 is the sending host. As such, the sending sub-virtual network is virtual network 1. The router 14 utilizes the routing table 74 to determine the downstream virtual sub-networks. In this example, the downstream virtual sub-networks are 2 and 3. As such, the list of downstream virtual sub-networks 80 is generated, as shown in FIG. 3.

Having done this, the router 14 then generates a multi-cast group membership table 82. This is done by transmitting a management protocol message to other routers within the data network. Such a management protocol may be a GMP. The multi-cast group membership is determined on a per downstream virtual sub-network, edge device and port basis. As such, for the example of FIG. 1, the multi-cast group membership for group 1 includes port 1 of edge device 58 of sub-network 1, port 3 of edge device 58 which is in sub-network 3, port 3 of edge device 60, which is in sub-network 1, port 1 of edge device 62 which is in sub-network 2, and port 3 of edge device 62 which is in sub-network 3. The distributed router 14 is shown to have the ports identified in the multi-cast group membership 82 darkened.

Figure 4:
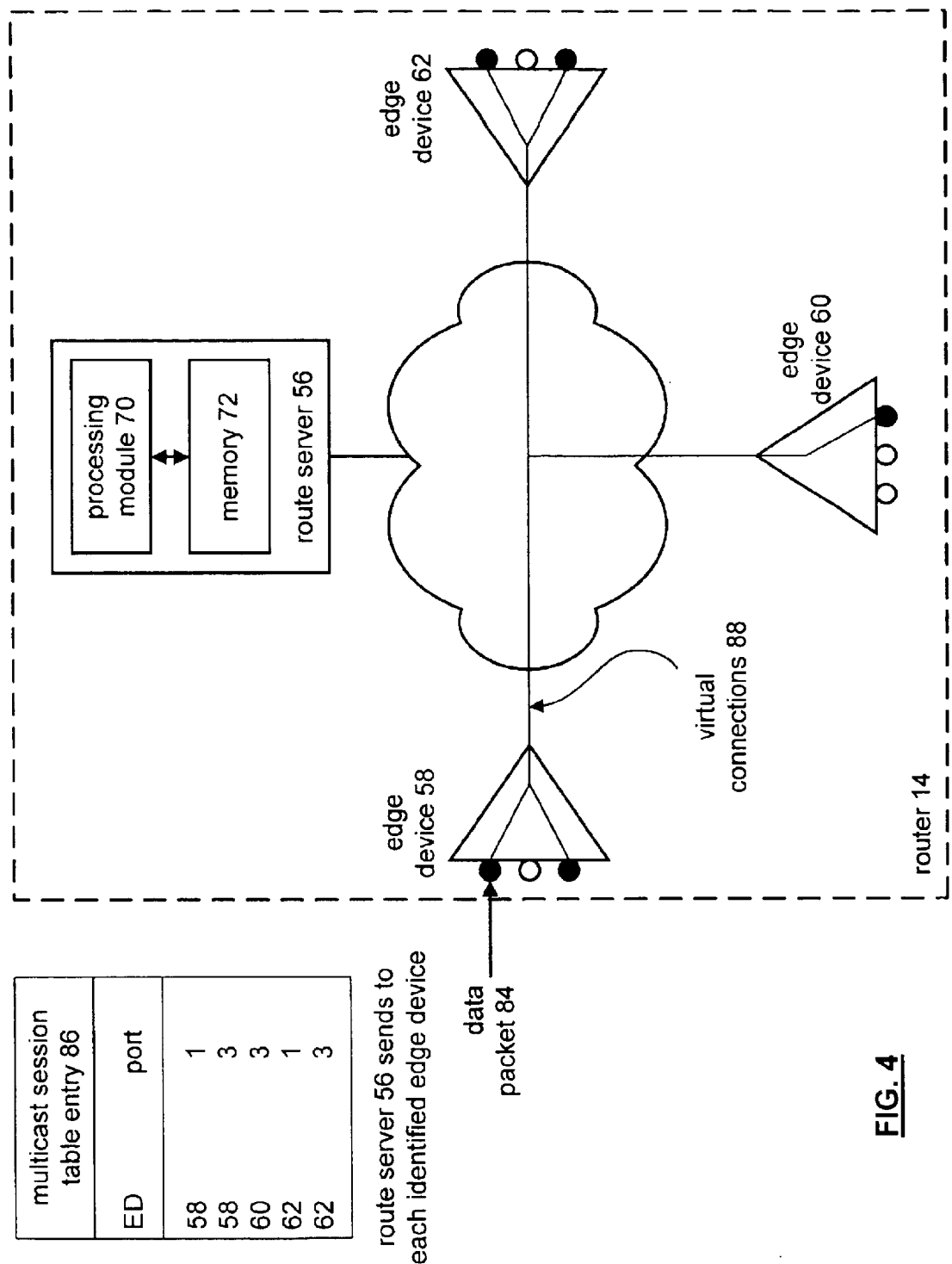
FIG. 4 illustrates a distributed router generating a multi-cast transmission session table entry in accordance with the present invention.

FIG. 4 illustrates the distributed router 14 generating a multi-cast session table entry table 86. In general, the router 14 includes a multi-cast session table that includes an entry for each multi-cast being supported. In this example, the previously described multi-cast is being support. The multi-cast session table entry 86 is generated upon receiving a data packet from the sending host device. The multi-cast session table entry 86 is generated based on the host of downstream virtual sub-networks 80 and the multi-cast group membership table 82. As such, this information contains the edge devices and ports needed to be interoperably coupled to support the group multi-cast transmission.

The router 14 utilizes the multi-cast session table entry 86 to generate virtual connections 88. As shown, the virtual connection 88 establishes a single connection between the ports of the edge devices that support members of this multi-cast group. In addition, this virtual connection 88 excludes other ports of the virtual sub-networks that are not supporting members of the group. Having established the virtual connections 88, the routing server 56 forwards the multi-cast session table entry 86 to each of the edge devices 58–62. The edge devices utilize the multi-cast session table entry 86 to generate forwarding information such that when it receives packets, it determines the particular edge devices for subsequent forwarding of data packets.

Figure 5:
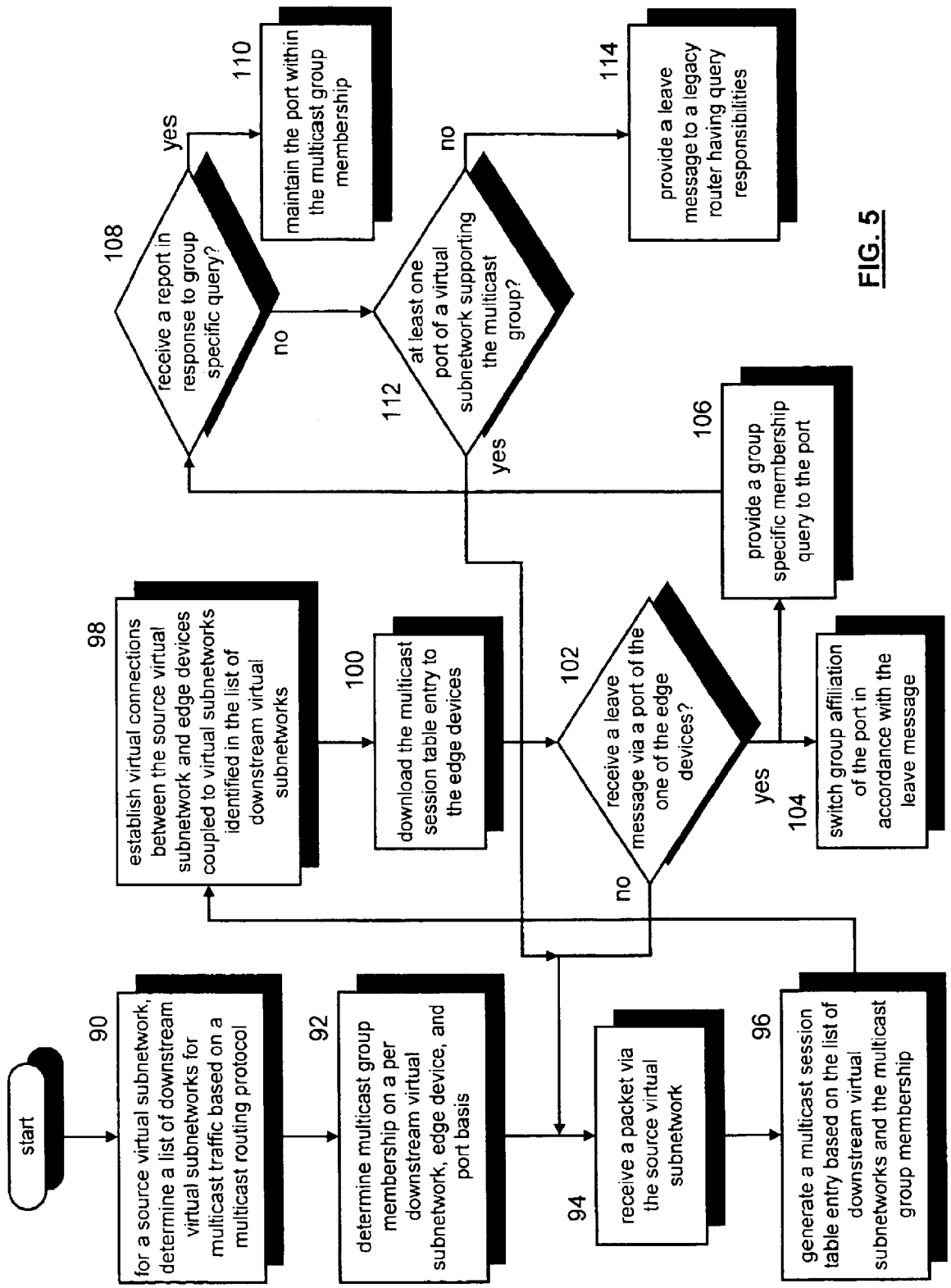
FIG. 5 illustrates a logic diagram of a method for providing multi-cast transmissions using a distributed router in accordance with the present invention.

FIG. 5 illustrates a logic diagram of a method for providing multi-cast transmissions within a data network that includes at least one distributed router. The process begins at step 90 where, for a source virtual sub-network, a list of downstream virtual sub-networks is determined for multi-cast traffic based on a multi-cast routing protocol. Such a determination may be made by receiving a routing protocol message from a router associated with one of a plurality of virtual sub-networks. The routing protocol message is then interpreted to determine the ports of edge devices coupled to downstream routers. Having made this determination, the routing protocol messages are sent to the downstream routers. As such, the routers communicate utilizing the routing protocol to determine the topology of the data network, i.e., the routing table 74 of FIG. 2.

The process then proceeds to step 92 where a multi-cast group membership is determined on a per downstream virtual sub-network, edge device, and port basis. This may be accomplished by providing a membership query, such as an IGMP message on a virtual sub-network. As ports of the edge devices receive a report which is in accordance with the IGP message from hosts affiliated therewith, they are provided to the routing server. The router server suppresses forwarding of the report to the other virtual sub-networks, thereby reducing traffic. As one of average skill in the art will appreciate, in a data network that includes only legacy routers, the establishment of the group membership is done by providing the IGMP membership query between the routers. If a router receives a report from a host that is a member, it transmits an indication that it has received a report via that virtual sub-network such that other hosts that are affiliated with the group do not also respond, i.e., provide a report. In the distributed router environment, however, since multiple ports may be supporting a single virtual subnetwork, it is undesirable to provide a response indicating that a report has been received. As such, the present invention suppresses forwarding of a report to other ports in the virtual network such that those ports may respond individually. The routing server, however, does provide the report received message via the port that it received the message from.

The determination of a multi-cast membership group may be done in a different manner when a legacy router has querying responsibilities. In this instance, a query is received from a legacy router. The query is requesting whether the router has any members of a group affiliated therewith. Upon receiving the query, it is forwarded to the plurality of virtual sub-networks via the edge devices support the plurality of virtual sub-networks. Reports are received from the ports for each of the plurality of virtual sub-networks and are forwarded up to a given number of reports to the legacy router. As such, the legacy router is determining whether the distributed router, e.g., router 14, needs to receive data packets for group communications. Since the distributed router may have multiple members of the group associated therewith, it may receive multiple reports indicating the affiliations. Utilizing the standard IGMP protocols, each report would be provided to the querying legacy router. However, this would create unnecessary data traffic. As such, the present invention only provides a given number, e.g., two, reports to the legacy router. This also enables the legacy router to flag the distributed router within the forwarding information. Note that reports received in access of the given number are suppressed, i.e., not provided to the legacy router.

The process then proceeds to step 94 where a data packet is received from a sending host via the source virtual network. The source virtual network is the virtual sub-network supporting the sending host. The process then proceeds to step 96 where a multi-cast session table entry is generated based on the list of downstream virtual sub-networks and the multi-cast group membership. The multi-cast session table entry includes ports of edge devices that are coupled to legacy routers and/or hosts.

The process then proceeds to step 98 where virtual connections are established between the source virtual sub-network and edge devices coupled to virtual sub-networks identified in the list of downstream virtual sub-networks. This was illustrated in FIG. 4. The process then proceeds to step 100 where the multi-cast session table entry is downloaded to the edge devices. The edge devices utilize this information to forward packets thereby supporting the multi-cast transmission.

The process may proceed to step 102 where a determination is made as to whether a leave message is received via a port of one of the edge devices. In other words, is one of the host devices that is a member of the group providing information that it is leaving the group. If not, the process repeats at step 94. If, however, the leave message has been received the process proceeds to step 104 and 106. At step 104, the group affiliation of the port is immediately switched in accordance with the leave message. This immediate switching can be quite beneficial when the data network is utilized for on-demand video, cable broadcasts, television broadcast, etc. As such, the leave message may be a channel change message. Accordingly, the user would prefer that the channel change request be processed immediately as opposed to traditional processing of leave messages in a data network.

For other types of data transmissions within a data network, the process would proceed to step 106. At step 106, a group-specific membership query is provided to the port.

This query is determining whether the host providing the leave message is the only host supported by this port. The process then proceeds to step 108 where a determination is made as to whether a report has been received in response to the specific query. In other words, is there at least one other host still being supported by this port. If so, the process proceeds to step 110 where the port is maintained within the multi-cast group membership.

If there are no hosts still being supported by this port, the process proceeds to step 112. At step 112, a determination is made as to whether at least one port of a virtual subnetwork is supporting the multi-cast group. In other words, does the distributed router have at least one other port which has at least one other host still a member of this group. If not, the process proceeds to step 114 where a leave message is provided to a legacy router having query responsibilities. If, however, the distributed router has a port that is supporting at least one host of the group, the process reverts to step 94.

FIG. 6 illustrates a logic diagram of an alternate method for providing multi-cast transmissions within a data network having distributed routers. The process begins at step 120 where a routing table is generated based on topology of virtual sub-networks. This was illustrated with reference to FIG. 2. The routing table may be generated by receiving a routing protocol message, e.g., DVMTRP, from a router associated with one of the virtual sub-networks. The routing protocol message is then interpreted to determine ports coupled to a downstream router, or routers. Upon making this determination, the routing protocol messages are provided to those downstream routers.

The process then proceeds to step 122 where a group affiliation table is generated based on multi-cast group affiliation. In other words, the group affiliation table is identifying members of the group and which ports of which edge devices of which of the distributed routers are supporting the group. This may be done by utilizing a membership query protocol such as IGMP. The process then proceeds to step 124 where a multi-cast session table entry is generated from the routing table and the group affiliation table when a packet is detected for the group. The multi-cast session table includes ports that are coupled to at least one of a legacy router supporting a membership of the group or a host, wherein the host includes a computer that is a member of the group. The process then proceeds to step 126 where virtual connections are established based on the multi-cast session table entry to transport data packets to members of the group.

The preceding discussion has presented a method and apparatus for providing multi-cast transmissions within a distributed network that includes distributed routers. By modifying utilization of multi-cast protocols for data networks that include legacy routers, the present invention provides an efficient mechanism for multi-cast group transmission. In addition, the present invention overcomes the previous embodiments of data networks that included distributed routers wherein multi-cast transmission were treated as broadcasts. As one of average skill in the art will appreciate, the other embodiments may be derived from the teachings of the present invention without deviating from the scope of the claims or the spirit of the invention.

What is claimed is:

1. A method for providing multicast transmissions using a distributed router, the method comprises the steps of:

a) determining, for a source virtual subnetwork, a list of downstream virtual subnetworks for multicast traffic based on multicast routing protocol;

b) determining multicast group membership on a per downstream virtual subnetwork, edge device, and port basis;

c) receiving a packet via the source virtual subnetwork;

d) upon receiving the packet, generating a multicast session table entry based on the list of downstream virtual subnetworks and the multicast group membership;

e) establishing virtual connections between the source virtual subnetwork and edge devices coupled to virtual subnetworks identified in the list of downstream virtual subnetworks; and f) downloading the multicast session table entry to the edge devices, wherein the distributed router comprises the edge devices.

2. The method of claim 1, wherein step (d) further comprises:

generating the multicast session table entry to include ports of the edge devices that are coupled to at least one of: a legacy router and a host.

3. The method of claim 1, wherein step (a) further comprises:

receiving a routing protocol message from a router associated with one of a plurality of virtual subnetworks, wherein the plurality of virtual subnetworks includes the source virtual subnetworks and the destination virtual subnetworks;

interpreting the routing protocol message to determine ports of the edge devices coupled to downstream routers;

sending, via the ports, routing protocol messages to the downstream routers.

4. The method of claim 1, wherein step (b) further comprises:

providing a membership query on a virtual subnetwork;

receiving, via a port of one of the edge devices, a report in response to the membership query; and suppressing forwarding of the report to other ports of the virtual subnetwork.

5. The method of claim 1 further comprises:

receiving a leave message via a port of one of the edge devices, wherein the leave message indicates that a member desires to leave a multicast group;

providing a group specific membership query to the port of the one of the edge devices; and when a report is received in response to the group specific membership query, maintaining the port of the one of the edge devices within the multicast group membership.

6. The method of claim 1 further comprises:

receiving a leave message (IGMP) via a port of one of the edge devices; and switching group affiliation of the port of the one of the edge devices in accordance with the leave message.

7. The method of claim 1, wherein step (b) further comprises:

receiving a query from a legacy router;

forwarding the query to a plurality of virtual subnetworks, wherein the edge devices support the plurality of virtual of subnetworks via ports;

receiving reports from the ports of each of the plurality of virtual subnetworks; and upon receiving reports per query interval, forwarding up to a given number of reports to the legacy router.

8. The method of claim 7 further comprises suppressing reports after the given number of reports have been forwarded to the legacy router.

9. A method for providing multicast transmissions using a distributed router, the method comprises the steps of:
   a) determining, for a source virtual subnetwork, a list of downstream virtual subnetworks for multicast traffic based on multicast routing protocol;
   b) determining multicast group membership on a per downstream virtual subnetwork, edge device, and port basis;
   c) receiving a packet via the source virtual subnetwork;
   d) upon receiving the packet, generating a multicast session table entry based on the list of downstream virtual subnetworks and the multicast group membership;
   e) establishing virtual connections between the source virtual subnetwork and edge devices coupled to virtual subnetworks identified in the list of downstream virtual subnetworks;
   f) downloading the multicast session table entry to the edge devices;
   receiving a leave message via a port of one of the edge devices, wherein the leave message indicates that a member desires to leave a multicast group;
   providing a group specific membership query to the port of the one of the edge devices;
   when a report is received in response to the group specific membership query, maintaining the port of the one of the edge devices within the multicast group membership;
   when a report is not received in response to the group specific membership query, determining whether at least one other port of a virtual subnetwork is supporting the multicast group; and
   when there are no other ports of the virtual network supporting the multicast group, providing a leave message to a legacy router having query responsibilities.

10. A method for providing multicast transmissions using a distributed router, the method comprises the steps of:
    a) generating a routing table based on topology of virtual subnetworks;
    b) generating a group affiliation table based on multicast group membership;
    c) generating within the distributed router a multicast session table entry from the routing table and the group affiliation table when a data packet is detected for a group; and
    d) establishing virtual connections based on the multicast session table entry to transport the data packet to members of the group.

11. The method of claim 10, wherein the topology of virtual subnetworks include at least one source virtual subnetwork and a plurality of destination virtual subnetworks.

12. The method of claim 10, wherein step (a) further comprises:
    receiving a routing protocol message from a router associated with one of the virtual subnetworks;
    interpreting the routing protocol message to determine ports coupled to downstream routers;
    sending, via the ports, routing protocol messages to the downstream routers.

13. The method of claim 10 further comprises downloading the multicast session table entry to edge devices.

14. The method of claim 10, wherein step (c) further comprises:
    generating the multicast session table entry to include ports that are coupled to at least one of: a legacy router supporting a member of the group and a host, wherein the host includes a computer that is a member of the group.

15. The method of claim 10, wherein step (b) further comprises:
    providing a membership query to the virtual subnetworks;
    receiving, via a port of a plurality of ports, a report in response to the membership query; and
    suppressing forwarding of the report to other ports of the plurality of ports.

16. The method of claim 10 further comprises:
    receiving a leave message via a port of a plurality of ports, wherein the leave message indicates that a member desires to leave the group;
    providing a group specific membership query to the port; and
    when a report is received in response to the group specific membership query, maintaining the port within the multicast group membership.

17. The method of claim 10 further comprises:
    receiving a leave message via a port of a plurality of ports; and
    switching group affiliation of the port in accordance with the leave message.

18. The method of claim 10, wherein step (b) further comprises:
    receiving a query from a legacy router;
    forwarding the query to the virtual subnetworks, wherein edge devices support the plurality of virtual of subnetworks via ports;
    receiving reports from the ports for each of the plurality of virtual subnetworks; and
    upon receiving reports per query interval, forwarding up to a given number of reports to the legacy router.

19. The method of claim 18 further comprises suppressing reports after the given number of reports have been forwarded to the legacy router.

20. A method for providing multicast transmissions using a distributed router, the method comprises the steps of:
    a) generating a routing table based on topology of virtual subnetworks;
    b) generating a group affiliation table based on multicast group membership;
    c) generating a multicast session table entry from the routing table and the group affiliation table when a data packet is detected for a group;
    d) establishing virtual connections based on the multicast session table entry to transport the data packet to members of the group;
    receiving a leave message via a port of a plurality of ports, wherein the leave message indicates that a member desires to leave the group;
    providing a group specific membership query to the port;
    when a report is received in response to the group specific membership query, maintaining the port within the multicast group membership;
    when a report is not received in response to the group specific membership query, determining whether at least one other port is supporting the group; and when there are no other ports supporting the group, providing a leave message to a legacy router having query responsibilities.

21. A distributed router comprises:

a processing module; and memory operably coupled to the processing module, wherein the memory stores operational instructions that cause the processing module to (a) determine, for a source virtual subnetwork, a list of downstream virtual subnetworks for multicast traffic based on multicast routing protocol; (b) determine multicast group membership on a per downstream virtual subnetwork, edge device, and port basis; (c) receive a packet via the source virtual subnetwork; (d) upon receiving the packet, generate a multicast session table entry based on the list of downstream virtual subnetworks and the multi-cast group membership; (e) establish virtual connections between the source virtual subnetwork and edge devices coupled to virtual subnetworks identified in the list of downstream virtual subnetworks; and (f) download the multicast session table entry to the edge devices, wherein the distributed router comprises the edge devices.

22. The distributed router of claim 21, wherein the memory further comprises operational instructions that cause the processing module to generate the multicast session table entry to include ports of the edge devices that are coupled to at least one of: a legacy router and a host.

23. The distributed router of claim 21, wherein the memory further comprises operational instructions that cause the processing module to determine the list of downstream virtual subnetworks by:

receiving a routing protocol message from a router associated with one of a plurality of virtual subnetworks, wherein the plurality of virtual subnetworks includes the source virtual subnetworks and the destination virtual subnetworks;

interpreting the routing protocol message to determine ports of the edge devices coupled to downstream routers;

sending, via the ports, routing protocol messages to the downstream routers.

24. The distributed router of claim 21, wherein the memory further comprises operational instructions that cause the processing module to determine the multicast group membership by:

providing a membership query on a virtual subnetwork;

receiving, via a port of one of the edge devices, a report in response to the membership query; and suppressing forwarding of the report to other ports of the virtual subnetwork.

25. The distributed router of claim 21, wherein the memory further comprises operational instructions that cause the processing module to:

receive a leave message via a port of one of the edge devices, wherein the leave message indicates that a member desires to leave a multicast group;

provide a group specific membership query to the port of the one of the edge devices; and when a report is received in response to the group specific membership query, maintaining the port of the one of the edge devices within the multicast group membership.

26. The distributed router of claim 21, wherein the memory further comprises operational instructions that cause the processing module to:

receive a leave message via a port of one of the edge devices; and switch group affiliation of the port of the one of the edge devices in accordance with the leave message.

27. The distributed router of claim 21, wherein the memory further comprises operational instructions that cause the processing module to determine the multicast group membership by:

receiving a query from a legacy router;

forwarding the query to a plurality of virtual subnetworks, wherein the edge devices support the plurality of virtual of subnetworks via ports;

receiving reports from the ports for each of the plurality of virtual subnetworks; and upon receiving reports per query interval, forwarding up to a given number of reports to the legacy router.

28. The distributed router of claim 27, wherein the memory further comprises operational instructions that cause the processing module to suppress reports after the given number of reports have been forwarded to the legacy router.

29. A distributed router comprises:

a processing module; and memory operably coupled to the processing module, wherein the memory stores operational instructions that cause the processing module to (a) determine, for a source virtual subnetwork, a list of downstream virtual subnetworks for multicast traffic based on multicast routing protocol; (b) determine multicast group membership on a per downstream virtual subnetwork, edge device, and port basis; (c) receive a packet via the source virtual subnetwork; (d) upon receiving the packet, generate a multicast session table entry based on the list of downstream virtual subnetworks and the multi-cast group membership; (e) establish virtual connections between the source virtual subnetwork and edge devices coupled to virtual subnetworks identified in the list of downstream virtual subnetworks; and (f) download the multicast session table entry to the edge devices, wherein the memory further comprises operational instructions that cause the processing module to:

receive a leave message via a port of one of the edge devices, wherein the leave message indicates that a member desires to leave a multicast group;

provide a group specific membership query to the port of the one of the edge devices;

when a report is received in response to the group specific membership query, maintaining the port of the one of the edge devices within the multicast group membership;

when a report is not received in response to the group specific membership query, determine whether at least one other port of a virtual subnetwork is supporting the multicast group; and when there are no other ports of the virtual network supporting the multicast group, provide a leave message to a legacy router having query responsibilities.

30. A distributed router comprises:

a processing module; and memory operably coupled to the processing module, wherein the memory stores operational instructions that cause the processing module to (a) generate a routing table based on topology of virtual subnetworks; (b) generate a group affiliation table based on multicast group membership; (c) generate within the distributed router a multicast session table entry from the routing table and the group affiliation table when a data packet is detected for a group; and (d) establish virtual connections based on the multicast session table entry to transport the data packet to members of the group.

31. The distributed router of claim 30, wherein the memory further comprises operational instructions that cause the processing module to generate the routing table by:

receiving a routing protocol message from a router associated with one of the virtual subnetworks;

interpreting the routing protocol message to determine ports coupled to downstream routers;

sending, via the ports, routing protocol messages to the downstream routers.

32. The distributed router of claim 30, wherein the memory further comprises operational instructions that cause the processing module to download the multicast session table entry to edge devices.

33. The distributed router of claim 30, wherein the memory further comprises operational instructions that cause the processing module to generate the multicast session table entry to include ports that are coupled to at least one of: a legacy router supporting a member of the group and a host, wherein the host includes a computer that is a member of the group.

34. The distributed router of claim 30, wherein the memory further comprises operational instructions that cause the processing module to generate the group affiliation table by:

providing a membership query to the virtual subnetworks;

receiving, via a port of a plurality of ports, a report in response to the membership query; and suppressing forwarding of the report to other ports of the plurality of ports.

35. The distributed router of claim 30, wherein the memory further comprises operational instructions that cause the processing module to:

receive a leave message via a port of a plurality of ports, wherein the leave message indicates that a member desires to leave the group;

provide a group specific membership query to the port; and when a report is received in response to the group specific membership query, maintain the port within the multicast group membership.

36. The distributed router of claim 30, wherein the memory further comprises operational instructions that cause the processing module to:

receive a leave message via a port of a plurality of ports; and switch group affiliation of the port in accordance with the leave message.

37. The distributed router of claim 30, wherein the memory further comprises operational instructions that cause the processing module to generate the group affiliation table by:

receiving a query from a legacy router;

forwarding the query to the virtual subnetworks, wherein edge devices support the plurality of virtual of subnetworks via ports;

receiving reports from the ports for each of the plurality of virtual subnetworks; and upon receiving reports per query interval, forwarding up to a given number of reports to the legacy router.

38. The distributed router of claim 37, wherein the memory further comprises operational instructions that cause the processing module to suppress reports after the given number of reports have been forwarded to the legacy router.

39. A distributed router comprises:

a processing module; and memory operably coupled to the processing module, wherein the memory stores operational instructions that cause the processing module to (a) generate a routing table based on topology of virtual subnetworks; (b) generate a group affiliation table based on multicast group membership; (c) generate a multicast session table entry from the routing table and the group affiliation table when a data packet is detected for a group; and (d) establish virtual connections based on the multicast session table entry to transport the data packet to members of the group, wherein the memory further comprises operational instructions that cause the processing module to:

receive a leave message via a port of a plurality of ports, wherein the leave message indicates that a member desires to leave the group;

provide a group specific membership query to the port;

when a report is received in response to the group specific membership query, maintain the port within the multicast group membership;

when a report is not received in response to the group specific membership query, determine whether at least one other port is supporting the group; and when there are no other ports supporting the group, provide a leave message to a legacy router having query responsibilities.

\* \* \* \* \*